United States Patent [19]
Shibata et al.

[11] 3,799,317
[45] Mar. 26, 1974

[54] ARTICLE TRANSFERRING APPARATUS

[75] Inventors: Seiya Shibata; Takehiko Kannari; Junichi Mizuuchi, all of Osaka, Japan

[73] Assignee: Tsubakimoto Chain Co., Ltd., Osaka-chi, Japan

[22] Filed: July 24, 1972

[21] Appl. No.: 274,407

[30] Foreign Application Priority Data
July 29, 1971 Japan.............................. 46-56414

[52] U.S. Cl. ................................ 198/20 R, 214/89
[51] Int. Cl. ...................... B65g 47/42, B66b 17/00
[58] Field of Search ....... 198/20 R, 21, 179; 214/89

[56] References Cited
UNITED STATES PATENTS
3,580,377   5/1971   Kiehl.............................. 198/20 R Primary Examiner—Edward A. Sroka
Attorney, Agent, or Firm—Woodhams, Blanchard and Flynn

[57] ABSTRACT

An article transferring apparatus for transferring articles between various types of conveyors, such as through a three-dimensional route. The apparatus includes a device for picking up an article as carried on a first conveyor, which device is mounted on a carriage movable substantially parallel to a second conveyor. The carriage has means associated therewith for moving the article laterally toward the second conveyor and for depositing same on the second conveyor when the carriage and the second conveyor are moving at substantially the same speed.

10 Claims, 12 Drawing Figures

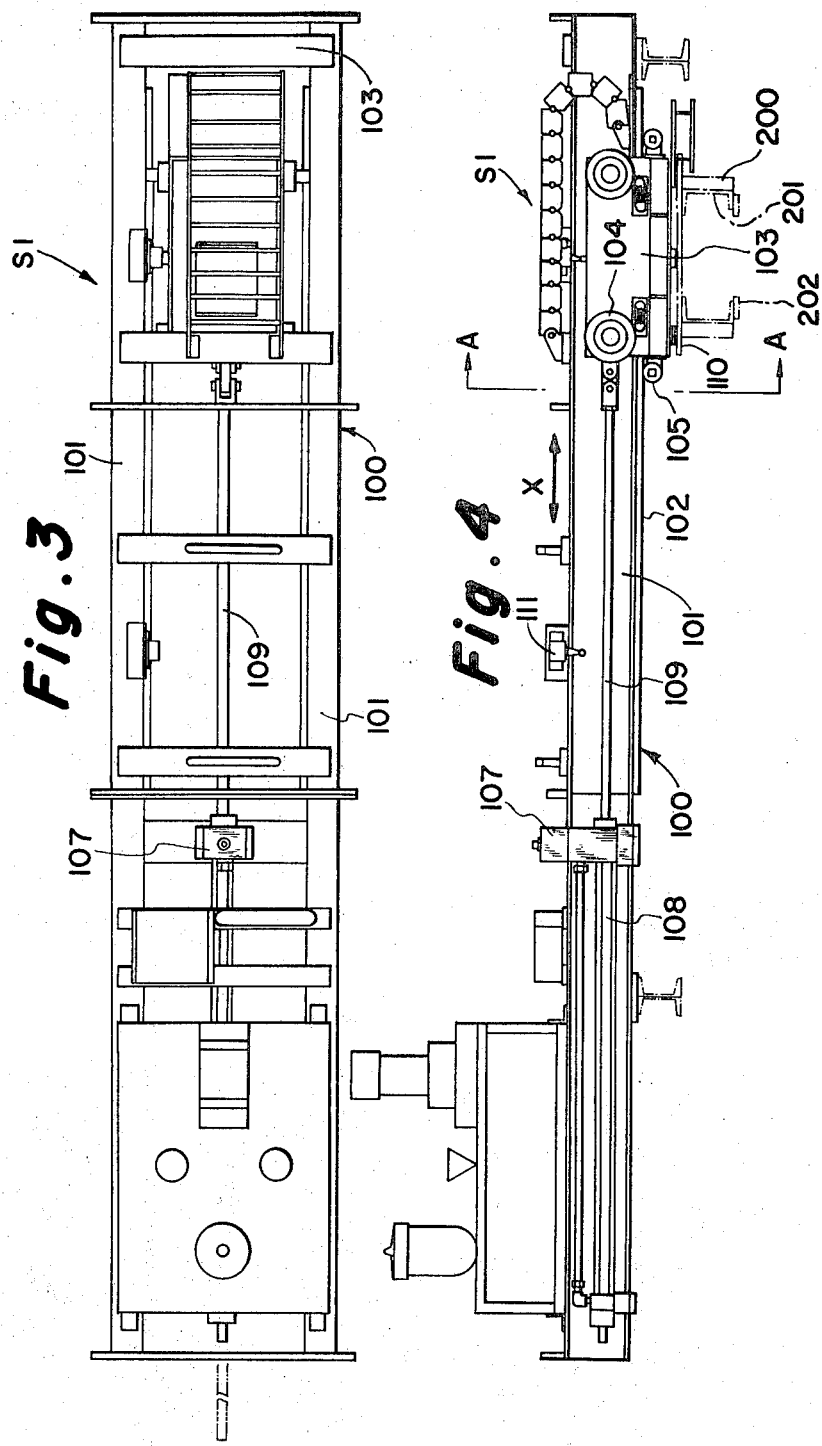

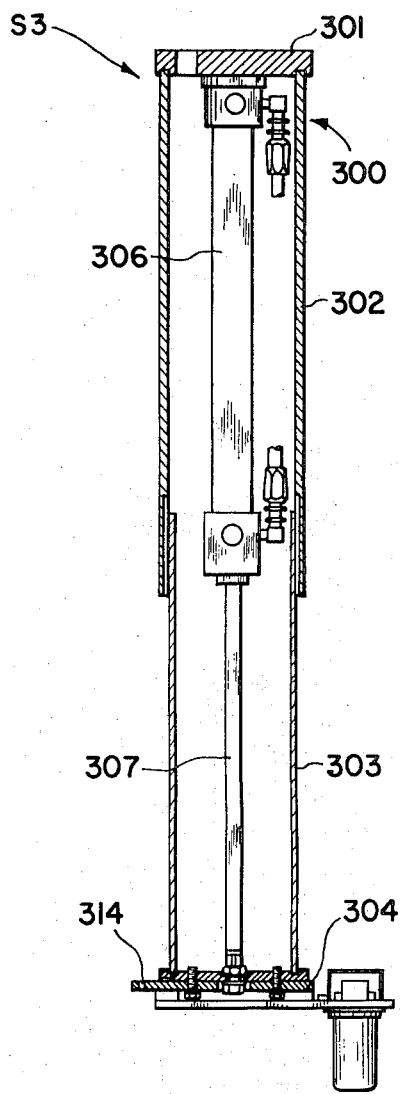
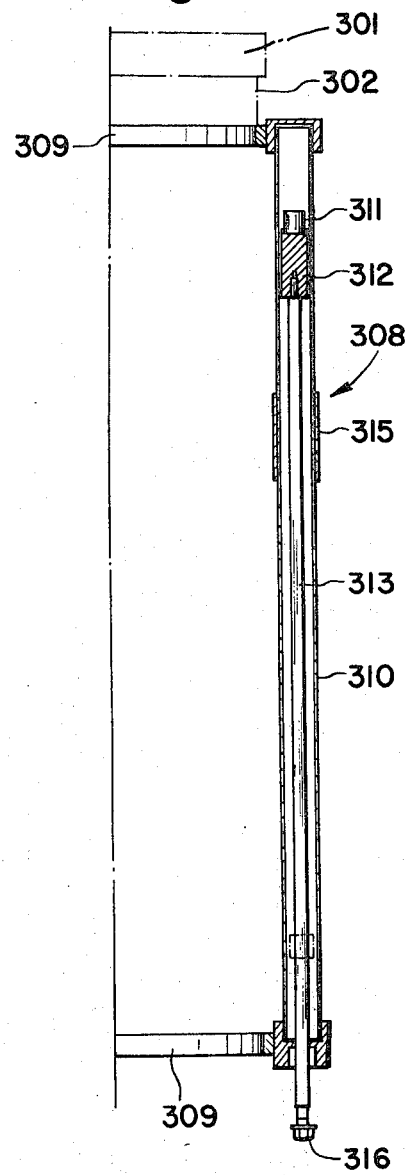
Fig. 10
Fig. 11

3,799,317

ARTICLE TRANSFERRING APPARATUS

FIELD OF THE INVENTION

The present invention relates to an article transferring apparatus that is adapted to transfer articles onto such conveying means as an overhead conveyor with a hanger.

BACKGROUND OF THE PRESENT INVENTION

Transfer of articles onto such an overhead conveyor with a hanger has conventionally been done mostly by hand or by catching an article by the hook. Disadvantages with this method are that it requires manpower and that it imposes certain restrictions on the installation location of the conveyor.

SUMMARY OF THE INVENTION

This invention has successfully overcome such difficulties by enabling automatic transfer of articles between various kinds of conveyors including the above-mentioned overhead conveyor with a hanger.

BRIEF DESCRIPTION OF THE DRAWINGS

The accompanying drawings illustrate an embodiment of the present invention, in which:

FIG. 3 is a plan view of a first structure;
FIG. 4 is a front view of the structure of FIG. 4;
FIG. 10 is a longitudinal cross section of a holding means;
FIG. 11 is a longitudinal cross section of a vertical position detecting device.

DETAILED DESCRIPTION

The apparatus of the present invention includes a first carriage which is mounted for linear reciprocating movement in a direction substantially parallel to a first conveyor, such as a hanger-type conveyor. A second carriage is mounted on the first carriage for movement in a second direction which is substantially perpendicular to the first direction, said second direction extending toward the first conveyor. The carriage means has a pick-up device mounted thereon which has an article engaging device associated therewith. The pick-up device is extendable outwardly to permit an article on a second conveyor to be engaged and removed therefrom. The first carriage, after the article has been removed from the second conveyor, is then moved along the first conveyor until the hangar and the first conveyor are moving at substantially the same speed, whereupon the second carriage is moved in said second direction to enable the article to be moved onto the hanger, whereupon the article engaging device is released to permit depositing of the article on the hangar. The first and second carriages are then returned to their original positions to permit the removing of a further article from the second conveyor.

Figure 1:
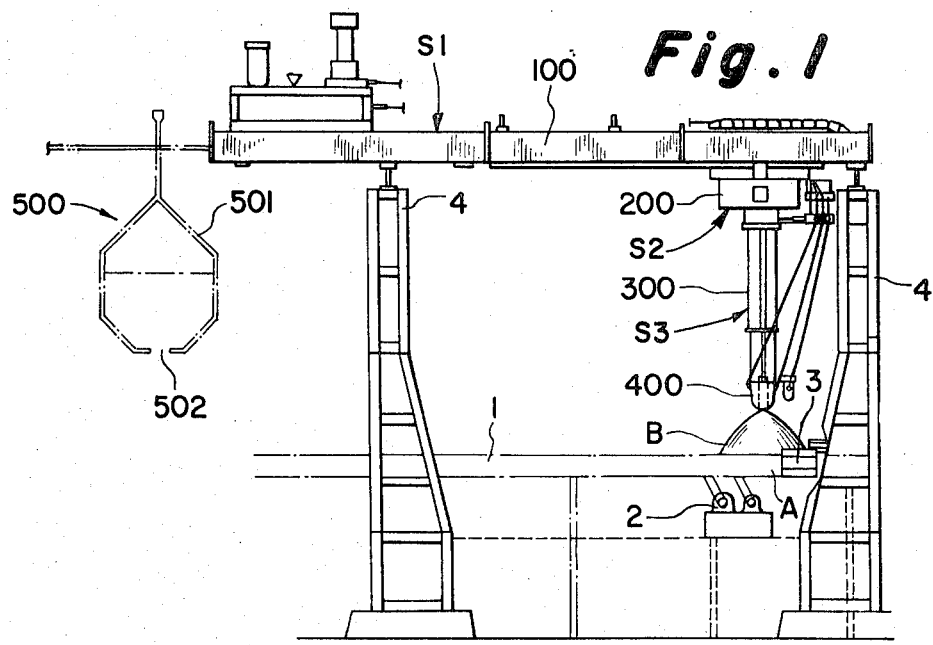
FIG. 1 is a front view.
Figure 2:
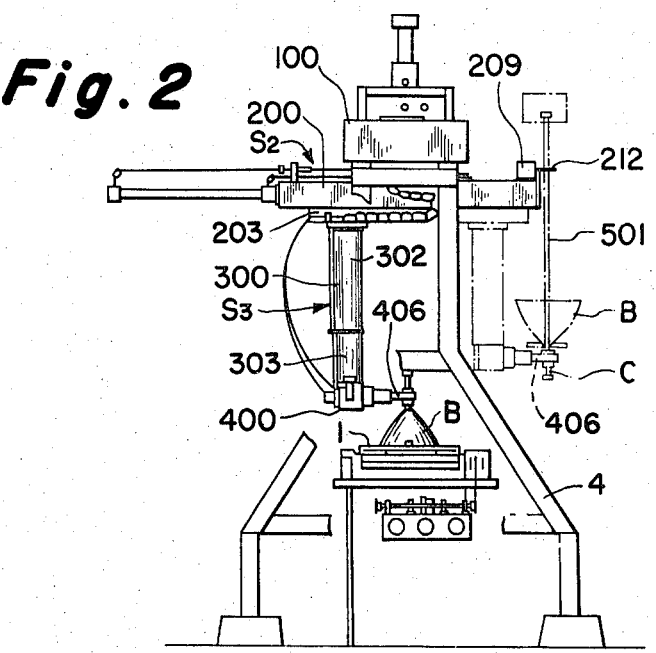
FIG. 2 is a side elevation view.

An embodiment of the present invention will be described in connection with the accompanying drawings. In FIGS. 1 and 2, reference numeral 1 designates a roller conveyor provided with stopper 3 at an end thereof, with a part of which being separately driven through a clutch 2. Reference numeral 4 represents a pair of struts provided symmetrically with respect to the roller conveyor 1, horizontally supporting at their top a frame 100 of a first transfer structure $S_1$.

Figure 5:
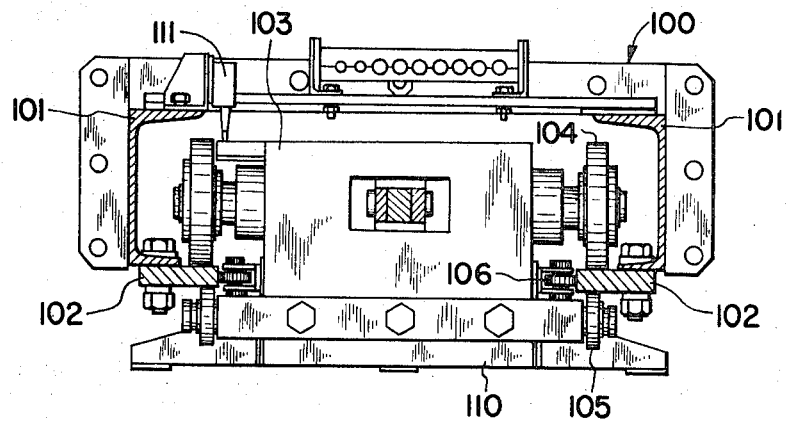
FIG. 5 is a cross sectional view taken on the line A—A of FIG. 4.

The frame 100 consists of a pair of oppositely disposed channels 101, running parallel with each other and connected to each other at their front and rear ends and upper side, as shown in FIGS. 3 to 5. A pair of guide rails 102 are attached, in parallel, to the lower side of channels 101. Item 103 is a first carrier that is guided to move in the direction X along the longitudinal direction of the frame 100 when wheels 104, 105 and 106, attached to the carrier through spindles, rotate in contact with the upper, lower and interior sides of the guide rails 102, respectively. At the rear end of the frame 100 there is provided a servo-valve 107 and a servo-cylinder 108, and a piston rod 109 extends therefrom in parallel with the guide rails 102 and is connected to the rear part of the first carrier 103. Said first carrier 103 is moved in the direction X by the servo-cylinder 108, its moving limit being established by means of a limit switch 111 and its moving speed controlled, as described later, by the servo-valve 107.

Figure 6:
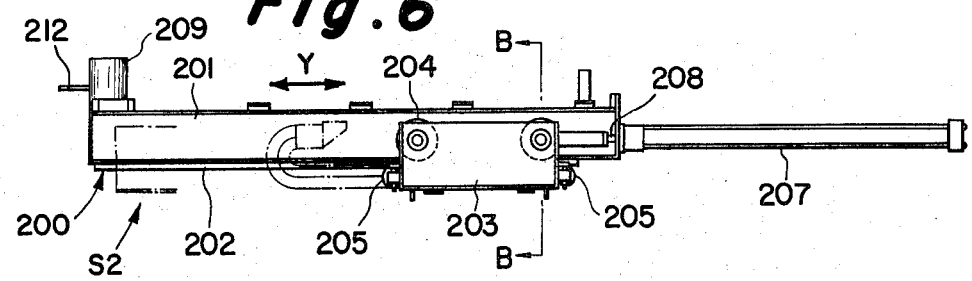
FIG. 6 is a front view of a second structure.
Figure 7:
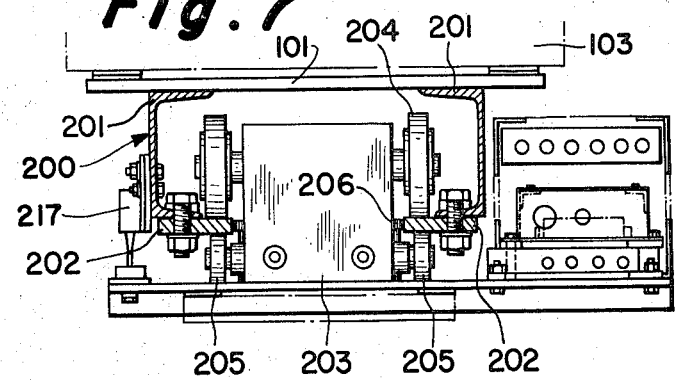
FIG. 7 is a cross sectional view taken on the line B—B of FIG. 6.

A frame 200 of a second transfer structure $S_2$ is attached to the lower side of said first carrier 103 through a support plate 110. The frame 200 consists of a pair of oppositely disposed channels 201 fixed to the underside of support plate 110, which channels 201 run parallel with each other and in a direction perpendicular to the direction X and are connected to each other at their front and rear ends and upper side, as shown in FIGS. 6 and 7. A pair of guide rails 202 are attached, in parallel, to the lower side of the channels 201. Item 203 is a second carrier that is guided to move, like said first carrier 103, in the direction Y along the longitudinal direction of the frame 200 by means of wheels 204, 205 and 206. At one end of the frame 200 is attached a cylinder 207 extending in the direction Y, and its rod 208 is connected to one side of the second carrier 203. The second carrier 203 is moved in the direction Y by the action of the cylinder 207, with its moving limit being established by a limit switch 217.

Figure 8:
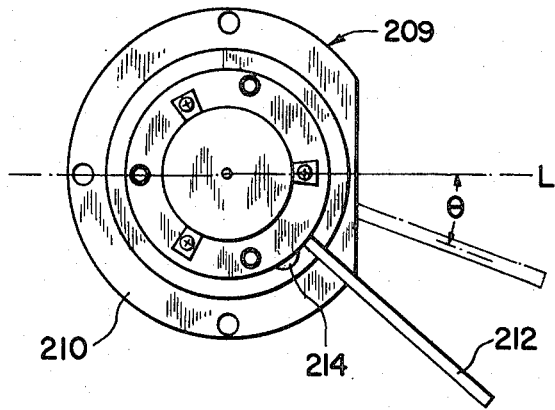
FIG. 8 is a plan view of a detector.
Figure 9:
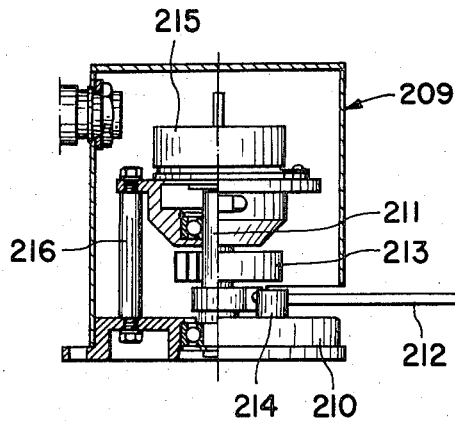
FIG. 9 is a longitudinal cross section of the detector of FIG. 8.

A detector 209 is mounted on the upper side of the end of the frame 200 opposite to the cylinder 207, which detector emits a detecting signal which actuates the servo-valve 107 to control the speed of the first carrier 103. To describe in further detail, the detector 209 consists of a rotating shaft 211 mounted vertically on a base plate 210 and fixed with a lever 212, and a spiral spring 213 interposed between said base plate 210 and shaft 211 so as to turn the lever clockwisely, as shown in FIGS. 8 and 9. The lever 212 usually remains at a standstill, in contact with a stopper 214 fixed to the base plate 210. Item 215 is a doughnut-shaped resistor supported by a stud 216 over the base plate 210, concentrically with said shaft 211. A contact member, slidingly coming in contact with the resistor 215, is fixed to the shaft 211, thus forming a potentiometer together with said resistor. This makes it possible to obtain a signal of a magnitude corresponding to an angle θ formed by the lever 212 relative to a standard setting position L. The magnitude of this signal controls the position of the servo-valve 107, which in turn controls the energization of cylinder 108 so as to move carriage 103 at the same speed as the conveyor hanger 501.

Under the second carrier 203 there is attached a frame 300 of an article holding and pick-up means $S_3$ which frame 300 is attached to the second carrier 203 and extends vertically downwardly therefrom. Said frame, as shown in FIG. 10, has an an end plate 301 fixed to the second carrier 203, a vertical outer pipe 302 one end of which is fixed to said end plate 301, an inner pipe 303 inserted inside said outer pipe 302 and fixed so as not to rotate relative thereto by means of the engagement of an axially cut slit and is a bolt (not shown) coacting between pipes 302 and 303. An end plate 304 is fixed to the lower end of said inner pipe 303, with a cylinder 306 being placed therein with its one end being attached to the end plate 301 and the lower end of its piston rod 307 connected to the end plate 304. Thus the inner pipe section 303 extends and contracts relative to pipe 302 as the piston rod 307 moves outward and inward.

A vertical position detecting device 308 is mounted on the outside of and in parallel with the outer pipe section 305. Said vertical position detecting device, as shown in FIG. 11, consists of a cylinder 310 of non-magnetic material whose upper and lower ends are fixed to fitting rings 309 attached to the outer pipe 302, a supporting member 312 slidably fitted within cylinder 310 and having a permanent magnet 311 mounted on top thereof, and a rod 313 whose upper end is attached to said supporting member 312 and whose lower end is passed through a hole 314 (FIG. 10) in the end plate 304 and fastened thereto with a nut 316. Outside the cylinder 310 there is provided a lead switch 315 which is designed to operate in response to the approach of the permanent magnet 311, and whose operating signal is used for detecting the vertical position of the end plate 304, that is, the vertical position of an article described later, or for controlling the extension and contraction of the telescopic pipe assembly 302–303.

Figure 12:
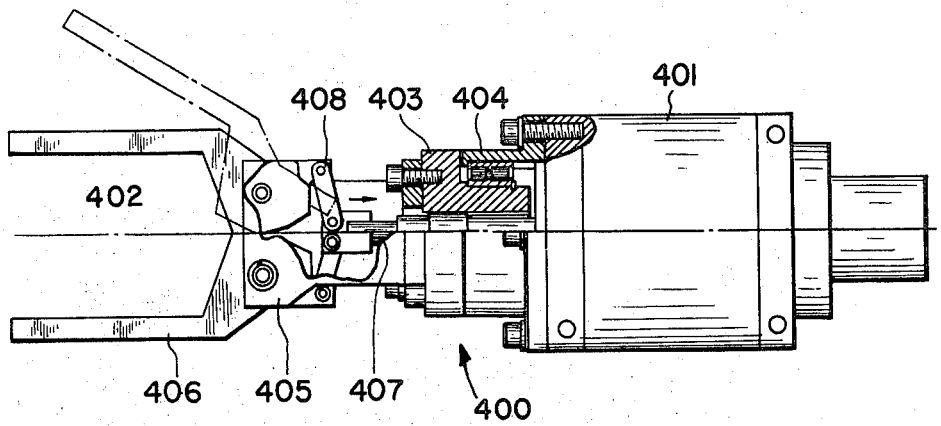
FIG. 12 is a plan view of an article engaging device with a part thereof broken away.

A horizontally extending article engaging device 400 is fixed to the end plate 304 of the frame 300. As shown in FIG. 12, said device 400 has an oscillating motor 401 and an article holding section 402. An oscillating boss 403 of the oscillating motor 401 is rotatably supported by a fixed boss 404, while supporting a finger supporter 405 in its front. A pair of fingers 406 are pivotally pinned to the finger supporter 405, and the rear part of said fingers is connected by a link 408 to the top end of a rod 407 moving forward and backward at the oscillating center of the oscillating motor 401. When the rod 407 moves forward the fingers 406 close to hold an article, while when the rod moves backward the fingers open to release the article. In addition, the article thus held can be turned upside down by turning the holding section through 180°.

In FIGS. 1 and 2, item 500 is an overhead conveyor whose hanger 501 moves in the direction X and turns the lever 212 by coming in engagement therewith as it passes by the detector 209. The hanger 501 may be shaped in such a manner as to fit the shape of the article to be transferred. In the embodiment cited herein, for example, it is shaped approximately hexagonally in cross-section since it is intended for the transfer of Braun tubes. This hanger has a clearance 502 at its bottom, which is so shaped as to accept the tubular part C of a Braun tube B, thus making it possible to hang the Braun tube B upside down in a stable manner.

Now the operational phase of the present invention will be described below. In the first place, when the Braun tube B, conveyed by the roller conveyor 1 from the left in FIG. 1, reaches the transfer zone A, a limit switch operates to release the clutch 2, and the Braun tube is stopped at a predetermined position by means of the stopper 3. A signal detecting the arrival at the predetermined position actuates the holding means $S_3$, and its cylinder 306 lowers the article engaging device 400 to a predetermined position where the lead switch 315 is actuated to stop the descent of the cylinder 306. At the same time, the fingers 406 (normally in an opened state) close to grasp the tubular part C of the Braun tube. The, cylinder 306 is again energized to raise the piston rod 307 causing the device 400 to raise the Braun tube B and, at the same time, motor 401 is energized to turn the finger support 405 through 180° to hold the Braun tube upside down and stay at a standstill.

Aftef the device 400 stops as described above, the detector 209 is actuated and the lever 212 thereof is rotated by the moving hanger 501. This causes a signal of such magnitude as corresponding to the angle $\theta$ formed between the hanger and the standard setting position L to be emitted, whereby the servo-valve 107 of the first transfer structure $S_1$ is opened to actuate the servo-cylinder 108 and cause the first carrier 103 to move leftward from the right end shown in FIG. 1. The running speed of the first carrier 103 is automatically controlled so that it is decelerated when the angle $\theta$ is positive (i.e. when the lever 212 lies between the stopper 214 and the standard setting position L), accelerated when the angle $\theta$ is negative (i.e. when the lever 212 goes beyond the standard setting position L), and operated at the same speed as the hanger 501 when the angle $\theta$ is zero. Therefore, the first carrier 103 and the tube B move adjacent to and in parallel with the hanger 50, at the same speed. When their speeds are equalized or, that is the angle $\theta$ becomes zero, the second transfer structure $S_2$ comes into operation, and the cylinder 207 causes the second carrier 203 to advance rightward in FIG. 2, causing the tubular part C of the Braun tube B to be inserted into the hanger clearance 502, the rightward movement of carrier 203 being stopped by the action of the limit switch when part c reaches the center of the clearance 502 (the position shown by a dot-dash-line in FIG. 2). Then the cylinder 306 of the holding means $S_3$ lowers the device 400 and the fingers 406 are opened by rod 407 to transfer the Braun tube B onto the hanger 501. When the fingers 406 are opened, the second carrier 203 retreats leftwardly in FIG. 2 to the original position (as shown by a solid line in FIG. 2) where it is stopped by the action of the limit switch, and the detector 209 becomes de-energized. On the other hand, the first carrier 103 is stopped by the limit switch 111 The hanger 501 disengages itself from the lever 212 of the detector by rotating it. The first carrier 103, after once stopped, is returned to the right end shown in FIG. 1 by the cylinder 108, as the second carrier 203 retreats as described above.

By repeating the above-described operation, the articles on the roller conveyor 1 are transferred one by one onto the overhead conveyor 500. Also it should be easily understood that the articles conveyed by the hanger may be transferred to another position by performing the same operation in the reverse order.

The above-mentioned operations can be achieved by the use of any known order control apparatus that requires no detailed description here.

According to the present invention, articles can be automatically transferred onto the hangers of the overhead conveyor from the side thereof. Or, otherwise, they may be automatically released from the hangers and transferred to an other place. This makes it possible not only to automatically transfer the articles between conveyors but also to transfer them through three-dimensional routes. This in turn permits extremely free layout for the conveyor and allows its alteration with ease.

What is claimed is:

1. An apparatus for transferring an article between a moving conveying device and a selected location, said apparatus comprising:
   first carriage means movable in a first path which is substantially parallel to the direction of movement of a section of said conveying device;
   first drive means drivingly connected to said first carriage means for causing reciprocating movement thereof along said first path;
   second carriage means movably mounted on said first carriage means for reciprocating movement in a second path which is substantially transverse to said first path;
   second drive means drivingly connected to said second carriage means for causing reciprocating movement thereof along said second path;
   article holding means movably mounted on said second carriage means for movement in a third path which is substantially transverse to one of said first and second paths; and
   control means for causing said first carriage means to move at substantially the same speed as said section of said conveying device and for causing said second carriage means to move toward said section of said conveying device to permit transfer of an article between said article holding means and said section of said conveying device.

2. An apparatus according to claim 1, wherein said article holding means includes a support member movably mounted on said second carriage means for movement along said third path, said support member having article engaging means mounted thereon, and third drive means coacting between said second carriage means and said support member for causing reciprocating movement of said support member relative to said second carriage means along said third path.

3. An apparatus according to claim 2, wherein said first drive means includes an extendible and contractible fluid pressure cylinder connected between a frame and said first carriage means for causing reciprocation of said first carriage means along said first path, wherein said second drive means includes an extendible and contractible fluid pressure cylinder drivingly connected between said first and second carriage means for causing reciprocating movement of said second carriage means relative to said first carriage means along said second path, and wherein said third drive means includes an extendible and contractible fluid pressure cylinder drivingly connected between said second carriage means and said support member for causing reciprocating movement of said support member relative to said second carriage means along said third path.

4. An apparatus according to claim 2, wherein said article engaging means includes a pair of relatively movable article engaging elements mounted on said support member.

5. An apparatus according to claim 4, wherein said article engaging means includes a drive device connected to said article engaging element for causing rotation thereof and of the article mounted thereon about an axis substantially transverse to said third path.

6. An apparatus according to claim 2, further including detecting means mounted on said first carriage means and including a sensing portion disposed for coaction with said conveying device for detecting same, said detecting means including means for sensing the relative speed between said section of said conveying device and said first carriage means and for emitting a signal which is approximately proportional to said relative speed and a control unit operatively controlled by the signal emitted from said detecting means, said control unit controlling said first drive means for causing said first carriage means and said section of said conveyor means to be moved at substantially the same speed.

7. An apparatus according to claim 6, wherein said detecting means includes potentiometer means associated with said sensing portion for emitting a signal, the position of said sensing portion relative to said potentiometer means being determinative of the magnitude of the signal generated by said potentiometer.

8. An apparatus according to claim 7, wherein said potentiometer comprises a ringlike resistor, and wherein said sensing portion includes a leverlike element associated with said ringlike resistor and disposed for rotation relative thereto, said leverlike element being positioned for contacting a part of said conveying device whereby relative speed between said conveying device and said first carrier means causes said leverlike element to be rotated relative to said ringlike resistor to vary the signal emitted by said detecting device.

9. An apparatus according to claim 6, wherein said first drive means includes fluid pressure cylinder means connected to said first carriage means for reciprocating same, and said control unit comprising servo-valve means for controlling the flow of pressure fluid to said cylinder means.

10. An apparatus according to claim 1, including a frame having a first stationary guide track extending therealong and defining said first path, said first carriage means being supported for linear movement along said first guide track, said first carriage means in turn having a second elongated guide track fixedly mounted thereon and extending in a direction substantially perpendicular to said first guide track, said second guide track defining said second path with said second path being substantially perpendicular to said first path, said second path also extending in a direction toward the direction of travel of said section of said conveying device, and said third path being substantially perpendicular to both said first and second paths.

* * * * *